United States Patent [19]

Fey et al.

[11] Patent Number: 4,595,610
[45] Date of Patent: Jun. 17, 1986

[54] CURABLE SILICONE COMPOSITIONS FOR THE PROTECTION OF POLYURETHANE FOAM

[75] Inventors: Kenneth C. Fey, Midland; Harold V. Lefler, III, Sanford, both of Mich.

[73] Assignee: Dow Corning Corporation, Midland, Mich.

[21] Appl. No.: 627,136

[22] Filed: Jul. 2, 1984

[51] Int. Cl.[4] .......................... B32B 27/00; B05D 5/00; C08L 83/00; C08L 83/04
[52] U.S. Cl. .................. 428/319.3; 427/244; 427/386; 427/387; 428/425.5; 428/447; 521/112; 524/588; 524/860; 524/861; 524/862; 524/863; 528/15; 528/18; 528/21; 528/24; 528/33
[58] Field of Search ............... 524/588, 860, 861, 862, 524/863; 528/15, 24, 33, 21, 18, 32; 428/319.3, 425.5, 447; 427/244, 386, 387, 395.5; 521/112

[56] References Cited

U.S. PATENT DOCUMENTS

| | | | |
|---|---|---|---|
| 3,894,169 | 7/1975 | Miller | 428/319.3 |
| 4,025,687 | 5/1977 | Wooler et al. | 428/319.3 |
| 4,310,678 | 1/1981 | Blizzard et al. | 556/451 |
| 4,332,518 | 3/1982 | Blizzard | 528/15 |
| 4,346,205 | 8/1982 | Hiles | 428/319.3 |
| 4,444,944 | 4/1984 | Matsushita | 524/786 |
| 4,465,805 | 8/1984 | Blizzard et al. | 528/15 |
| 4,476,188 | 10/1984 | Blizzard et al. | 524/430 |
| 4,483,894 | 11/1984 | Porter et al. | 521/112 |
| 4,495,340 | 1/1985 | Blizzard et al. | 528/15 |

Primary Examiner—Herbert J. Lilling
Attorney, Agent, or Firm—George A. Grindahl

[57] ABSTRACT

There is disclosed a room temperature curing silicone for protecting polyurethane foam. The silicone coating provides protection from ultraviolet light, water penetration, and mechanical damage. The silicone coating comprises a particular organosilicon resin, an hydroxyended silicone polymer, fillers, and an organotin catalyst.

56 Claims, No Drawings

CURABLE SILICONE COMPOSITIONS FOR THE PROTECTION OF POLYURETHANE FOAM

BACKGROUND OF THE INVENTION

The present invention relates to room temperature curable silicone compositions useful for protecting polyurethane foam.

Polyurethane foam, by which it is meant herein foamed solids formed by the reaction of liquid isocyanate components with liquid polyol resin components, is an extremely useful material. In the construction industry, for example, it is often sprayed onto roofs, tanks, and other objects requiring protection or insulation. Polyurethane foam is easy and convenient to apply or install, is strong, and provides excellent thermal insulation. Unfortunately, most polyurethanes in use are rapidly and severely degraded by ultraviolet radiation. Ultraviolet radiation, having a wavelength of from 180 Angstroms to 3900 Angstroms, comprises a significant portion of the Sun's radiation. Care must therefore be taken to minimize or prevent the exposure of polyurethane foam to sunlight.

Silicones are well known for their resistance to degradation by ultraviolet radiation. Therefore, silicones of various descriptions have seen use as protectants for polyurethane foam. Since spraying is the preferred mode of applying a silicone coating over polyurethane foam, it is desirable that the silicone be sprayable. Heretofore, it has been necessary that the silicone be either diluted with solvent or provided in emulsion form so that it could be sprayed. The previously known polyurethane foam protecting silicones have not been entirely satisfactory.

For example, silicones applied at less than 80% by weight silicone solids, i.e. 20% solvent or water, tend to shrink as the solvent or water evaporates. The use of silicones containing 20% or more solvent also necessitates health, safety, and environmental precautions.

In addition, heretofore known polyurethane foam protecting silicones have been plagued by the adherence of dirt to the silicone coating and consequent degradation of appearance.

These problems have been solved by the compositions of the present invention and their use.

Related silicones are disclosed in U.S. Pat. No. 4,322,518, issued Mar. 30, 1982 to John Blizzard and assigned to the assignee of the present invention.

SUMMARY OF THE INVENTION

It is an object of the present invention to provide room temperature curable compositions combining low viscosity in the uncured state with physical strength in the cured state. It is another object to provide compositions with good adhesion to polyurethane foam. It is another object to provide low solvent or solventless room temperature curable compositions for protecting polyurethane foam. It is yet another object to provide a composition that cures to form a smooth, attractive abrasion resistant coating. It is another object to provide a method for protecting polyurethane foam, and to provide silicone-polyurethane foam laminates. It is another object to protect polyurethane foam from ultraviolet radiation and water penetration.

These objects and others are attained by the compositions and method of the present invention, and by the laminates produced by practicing the method of the present invention.

The compositions of the present invention comprise:
(A) a certain organosilicon resin;
(B) an hydroxyl ended polydiorganosiloxane;
(C) a filler; and
(D) an organotin catalyst.

DETAILED DESCRIPTION OF THE INVENTION

The present invention relates to a composition comprising the product obtained by mixing:
(A) from 1.0 to 400 parts by weight of the reaction product of
(i) an organosilicon resin consisting essentially of $R_3SiO_{\frac{1}{2}}$ units and $SiO_{4/2}$ units, wherein R represents a monovalent hydrocarbon radical, and the ratio of $R_3SiO_{\frac{1}{2}}$ units to $SiO_{4/2}$ units is from 0.6/1 to 0.9/1, and
(ii) a polyorganohydrogensiloxane;
(B) 100 parts by weight of a polydiorganosiloxane having the general formula $HO(R'_2SiO)_xH$, wherein R' represents a monovalent hydrocarbon radical and x has a value of from 10 to 1000;
(C) from 1 to 150 parts by weight of a filler; and
(D) from 0.10 to 13.3 parts by weight of an organotin catalyst.

In another aspect, the present invention relates to a method of protecting polyurethane foam, said method comprising applying to said polyurethane foam a composition comprising the product obtained by mixing:
(A) from 1.0 to 400 parts by weight of the reaction product of
(i) an organosilicon resin consisting essentially of $R_3SiO_{\frac{1}{2}}$ units and $SiO_{4/2}$ units, wherein R represents a monovalent hydrocarbon radical, and the ratio of $R_3SiO_{\frac{1}{2}}$ units to $SiO_{4/2}$ units is from 0.6/1 to 0.9/1, and
(ii) a polyorganohydrogensiloxane;
(B) 100 parts by weight of a polydiorganosiloxane having the general formula $HO(R'_2SiO)_xH$, wherein R' represents a monovalent hydrocarbon radical and x has a value of from 10 to 1000;
(C) from 1 to 150 parts by weight of a filler; and
(D) from 0.10 to 13.3 parts by weight of an organotin catalyst; and allowing said applied composition to cure.

In another aspect, the present invention relates to the laminate produced by the method of protecting polyurethane foam.

Component (A) of the composition of the present invention is the reaction product of: (i) an organosilicon resin consisting essentially of $R_3SiO_{\frac{1}{2}}$ units and $SiO_{4/2}$ units, wherein R is a monovalent hydrocarbon radical and the ratio of $R_3SiO_{\frac{1}{2}}$ units to $SiO_{4/2}$ unit is from 0.6/1 to 0.9/1; and (ii) a polyorganohydrogensiloxane.

Component (A) of the curable composition of the present invention is disclosed in U.S. Pat. No. 4,310,678, issued Jan. 12, 1982 to Blizzard and Swihart and assigned to the assignee of the present invention. The specification of U.S. Pat. No. 4,310,678 is hereby incorporated into the present specification by reference to describe Component (A) of the present invention and to teach methods of synthesizing said component (A).

Briefly stated, component (A) can be synthesized by reacting together:
(i) an organosilicon resin consisting essentially of $R_3SiO_{\frac{1}{2}}$ units and $SiO_{4/2}$ units in the ratio stated above; and (ii) a polyorganohydrogensiloxane.

R in reactant (i) represents a monovalent hydrocarbon radical, that is, a monovalent radical composed of hydrogen atoms and carbon atoms. R can thus be an alkyl radical, such as methyl, ethyl, butyl, propyl and the like; an alkenyl or cycloalkenyl radical, such as vinyl, allyl, cyclopentenyl and the like; an aryl radical, such as phenyl, tolyl, xylyl and the like; an arylalkyl radical, such as beta-phenylethyl, beta-phenylpropyl and the like; or a cycloaliphatic radical, such as cyclohexyl, cyclopentyl, cycloheptyl and the like. Preferably R is a lower alkyl radical, such as methyl, ethyl, or propyl. Most preferably, R is a methyl radical. Minor amounts of vinyl radicals as R radicals are beneficial to enhance reactivity in some cases. Reactant (i) contains from 0.1% to 5% by weight, based on the total weight of reactant (i), of hydroxyl radicals bonded to silicon atoms. Minor proportions of alkoxy radicals are often unintentionally present in organosilicon resins. The presence of alkoxy radicals in reactant (i) is not thought to have any effect on the ultimate curable silicone compositions.

Preferably, reactant (i) is comprised of 1 to 5 percent by weight of silicon-bonded hydroxyl radicals, based on the total weight of reactant (i).

For the purpose of making Component (A), reactant (i) is furnished dispersed in an appropriate organic solvent. It is advantageous to select an organic solvent which forms an azeotrope with water. Such organic solvents are well known for this purpose, and include, for example, benzene, toluene, xylene, and trichloroethane.

Organosilicon resins as described above for reactant (i), and their synthesis, are described in U.S. Pat. No. 2,676,182, issued Apr. 20, 1954, which patent is incorporated herein by reference to teach a method of synthesis for reactant (i).

To summarize a preferred method of synthesis of reactant (i), the following steps are performed:

1. An aqueous solution of sodium silicate is acidified to a pH value of less than about 5;
2. The resulting mixture is treated with a source of $R_3SiO_{\frac{1}{2}}$ units;
3. The mixture from step 2 is heated, then cooled;
4. The product of step 3 is fractionally extracted with an appropriate, water-immiscible organic solvent. An organosilicon resin suitable for use as reactant (i) is isolated in the organic solvent fraction.

Sources of $R_3SiO_{\frac{1}{2}}$ units include compounds having the general formula $R_3SiX$, wherein X is a hydrolyzable radical, such as a halogen radical, or alkoxy radical; a disiloxane of the general formula $(R_3Si)_2O$; or other sources of $R_3SiO_{\frac{1}{2}}$ units known to those skilled in the art.

Preferably, the extraction in step 4 above is carried out in such a manner that from 0.0018 to 0.018 equivalents of acid per gram of reactant (i) remain in the solvent/reactant (i) fraction.

Reactant (ii) of component (A) of the composition of the present invention is a polyorganohydrogensiloxane, as described in U.S. Pat. No. 4,322,518 issued Mar. 30, 1982. By polyorganohydrogensiloxane it is meant herein a liquid polyorganosiloxane containing an average of at least one silicon-bonded H radical per molecule.

Reactant (ii) can have a linear, cyclic, or branched polymeric structure, or appropriate combinations of these structures, provided that said reactant (ii) is a liquid. Radicals of reactant (ii) that are not silicon-bonded hydrogen radicals are selected from monovalent hydrocarbon radicals as hereinabove described. A linear polyorganohydrogensiloxane consisting primarily of $(CH_3)(H)SiO$ units, and having a degree of polymerization of from 25 to 75 repeat units is a preferred reactant (ii).

Poyorganohydrogensiloxanes suitable for use as reactant (ii) are well known; many are available commercially. Said polyorganohydrogensiloxanes need not be further detailed herein.

Preferably, reactant (i) and reactant (ii) can be reacted together to form component (A) in the following manner:

Reactant (i), dispersed in organic solvent, is first thoroughly mixed with reactant (ii). The resultant mixture is heated to volatilize and remove the organic solvent from the mixture. Said heating is preferably done in two stages. In a first stage, heating and removal of some of the organic solvent is accomplished at ambient pressure. In a second stage heating and solvent removal are continued at reduced pressure. The second stage is preferably continued until the organic solvent has been substantially removed.

By substantially removed it is meant herein that the concentration of organic solvent is less than 1% by weight, based on the total weight of the mixture.

Alternatively, some or all of the organic solvent can be retained along with the reaction product of (i) and (ii). It has been found that the adhesion of the final cured composition to underlying polyurethane foam is enhanced if from 1 to 15 percent by weight, of solvent, based on the total weight of the reaction product is retained with the reaction product.

If reactant (i), as furnished, does not contain from 0.0018 to 0.018 equivalents of acid per gram, it is necessary to add the required amount to provide 0.0018 equivalents per gram, of a strong acid, such as HCl, to the reaction mixture.

The relative amounts of reactant (i) and reactant (ii) that are used are not overly critical. Generally, from 10 to 90 parts by weight of reactant (i) are reacted with 90 to 10 parts by weight of reactant (ii). More preferably, roughly equal parts by weight of reactants (i) and (ii) are used, such as 40 to 60 parts by weight of reactant (i) and 60 to 40 parts by weight of reactant (ii), all of the above parts based on 100 total parts by weight of component (A).

Component (A) can be reacted with a reagent selected from the group consisting of acyloxysilanes, oximosilanes, and acyl halides. Compositions of the present invention made with Component (A) so reacted exhibit substantially enhanced shelf life and working time. By shelf life it is meant the time in which a composition can be stored in a sealed container without significantly affecting the rate of cure upon application. By working time it is meant the time in which the composition can be successfully worked, smoothed, tooled and such.

Acyloxysilanes have the general formula $R''_nSiX_{4-n}$, wherein R" is a monovalent hydrocarbon radical as described above and X is a aclyoxy radical, such as acetoxy, propionoxy, benzyloxy, cyclohexyloxy, acryloxy, methacrylyloxy, naphthoyloxy, trifluoroacetoxy, chlorobenzoyloxy and the like. The value of n in the formula for the acyloxysilane is 1, 2, or 3.

Acyl halides are organic reagents having the general formula R'''X', wherein R''' is an acyl radical, such as the above acyloxy radical with the terminal oxygen removed. X' is selected from F, Cl, Br, and I atoms.

Oximosilanes have the general formula $Q_{4-m}Si(ON=CR_2''')_m$ wherein each R''' is selected from hydrogen atoms and alkyl radicals having from 1 to 5 carbon atoms, Q is a monovalent hydrocarbon radical as described hereinabove, and m has a value of 1, 2, or 3.

As an example of reacting component (A) with a reagent as described above, the following experiment was performed, and is here described.

To 80 parts by weight of an organosilicon resin Component (A), 10 parts by weight of a mixture of ethyltriacetoxysilane and methyltriacetoxysilane were added. After three days, the above mixture was somewhat hazy. After 8 days, the above mixture appeared to have reacted, but was still somewhat hazy.

As another example reactant (i), reactant (ii) and acetyl chloride were mixed together. The mixture of three components was heated for 50 minutes, after which time solvent from reactant (i) and reaction by-products were removed by devolatilization under reduced pressure. The resultant product was found to be a clear fluid.

Component (B) of the compositions of the present invention is a polydiorganosiloxane having the general formula $$HO(R_2'SiO)_xH$$

wherein, in said general formula, R' is selected from the group consisting of monovalent hydrocarbon radicals as defined above for radical R of reactant (i).

Preferably, R' is selected from the group consisting of phenyl radicals and lower alkyl radicals such as methyl, ethyl, propyl, and butyl radicals. More preferably, most or all of the R' radicals are methyl radicals. Minor amounts of other radicals, such as might be unintentionally introduced in the manufacturing process, are not thought to adversely affect the usefulness of the compositions of the present invention.

The value of x in the above general formula for Component (B) is from 10 to 1000. When x has a value of 10, the viscosity of Component (B) is about 40 centistokes at 25° C. When x has a value of 1000, the viscosity of Component (B) is about 80,000 centistokes at 25° C.

The synthesis of polydiorganosiloxanes as described above, from more basic starting materials is quite well known and need not be repeated herein. Moreover, many such polydiorganosiloxanes are commerically available.

Two or more polydiorganosiloxanes as described above can be mixed together to form Component (B), provided the average value of x for all such polydiorganosiloxanes being mixed is from 10 to 1000.

Component (C) of the composition is a filler. Component (C) is selected from the known fillers for curable silicone compositions. The filler can be treated with conventional organosilicon treating agents which are well known in the art and include organosilanes such as dimethyldichlorosilane, organosiloxanes such as hexamethylcyclotrisiloxane and organosilazanes such as hexamethyldisilazane. Examples of useful fillers include crushed quartz, aluminum oxide, aluminum silicate, zirconium silicate, magnesium oxide, zinc oxide, talc, diatomaceous earth, iron oxide, calcium carbonate, clays, titania, zirconia, mica, glass, sand, carbon black, graphite, barium sulfate, zinc sulfate, wood flour, cork and fluorocarbon polymer powder among others. Two or more fillers can be combined for use as Component (C).

Silica fillers can be used, such as fume silica or precipitated silica, but silica fillers are of less utility in rendering the compositions of the present invention opaque to ultraviolet radiation than other fillers. Therefore, when silica fillers are employed, it will generally be in conjunction with other fillers.

Especially preferred fillers are carbon black, titania, and combinations of those two fillers. Carbon black and titania have been found to confer a high degree of opacity to compositions in which they are used.

The conjoint use of carbon black and titania also facilitates manufacturing compositions differing in shade. This is especially advantageous when spraying the compositions of the present invention onto polyurethane foam, by making unsprayed areas more readily visible. For instance, a first coat of the compositions of the present invention can be colored a dark grey by using a relatively high proportion of carbon black to titania. The first coat then will contrast in color with the light colored polyurethane foam. A second coat can be made light grey by using a low proportion of carbon black to titania. This second coat then, will contrast with the first coat, and will also provide an attractive appearance.

The organotin catalyst, Component (D) of the compositions of the present invention, is a member of a class of condensation catalysts that is well known in the art. The organotin catalyst can be, for example, a tin salt of a carboxylic acid, such as stannous lactate, stannous linoleate, stannous maleate, stannous octoate, stannous oleate, stannous napthenate, or stannous stearate; an alkyl tin salt of a carboxylic acid such as dibutyltindilaurate, dibutyltindiacetate, a dipropyltindilaurate; or the organotin catalyst can be a more complex species such as an organothiotin complex, amino substituted organotin carboxylate, and the like. Dibutyltindilaurate and dibutylindiacetate are preferred organotin catalysts.

From 1.0 to 400 parts of Component (A) are present; 100 parts of Component (B) are present; from 1 to 150 parts of Component (C) are present; and from 0.10 to 13.3 parts of Component (D) are present, all the above parts being parts by weight.

A more preferable range of composition is:
(A) 50 to 200 parts;
(B) 100 parts;
(C) 2 to 20 parts; and
(D) 1.0 to 6.0 parts; all of the above parts being parts by weight.

The most preferred range of composition is:
(A) 97.0 to 161.0 parts;
(B) 100 parts;
(C) 5.6 to 10.3 parts;
(D) 1.9 to 3.2 parts; all the above parts being parts by weight.

Other ingredients can also be added to the compositions of the present invention.

For example, dyes, pigments, thermal stabilizers, oxidation inhibitors, flame retardants, crosslinkers, adhesion promoters, solvents, and other adjuncts commonly used in curable silicon compositions can be added to the compositions of the present invention.

Crosslinkers can be added to increase the rate of cure or increase the degree of cure. From 1 to 20 parts by weight, based on 100 parts by weight of Component (B), can be used.

Exemplary of crosslinkers which may be used are alkylalkoxysilanes, alkylacetoxysilanes, and alkyloximosilanes, such as methyltrimethoxysilane, methyltriacetoxysilane, dimethyldioximosilane, and the like.

It has been found that ketones, aldehydes, alkylacetoxysilanes and carboxylic acids added at a level of from 1 to 40 parts by weight for each 100 parts by weight of component (B) serve to extend the shelf life of portions of the compositions of the present invention, and serve to extend the working time of the compositions of the present invention.

Epoxyfunctional silanes and acrylofunctional silanes have been found to be useful adjunct materials for the compositions of the present invention. For example, addition of from 0.1 to 20 parts by weight, based on 100 parts of Component (B), of gamma-methacryloxypropyltrimethoxysilane or gamma-glycidoxypropyltrimethoxysilane improves the surface of a cured composition of the present invention. Addition of either of the two above silanes renders the cured surface shinier, and more resistant to the adherence of dirt.

By epoxyfunctional silane it is meant herein a silane of the general formula

wherein D is a divalent linking group selected from divalent hydrocarbon radicals, divalent hydrocarbon radicals containing an ether linkage, and divalent hydrocarbon radicals containing a thioether linkage. The value of n in said general formula is 1, 2, or 3. X is a hydrolyzable radical as described above under the description of reactant (i) of Component (A).

By acrylofunctional silane it is meant herein a silane of the general formula

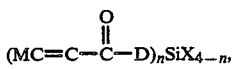

wherein X is a hydrolyzable radical as described above for the compounds having the general formula $R_3SiX$, n has a value of 1, 2, or 3, D is a divalent linking group as described above for the epoxyfunctional silane, and M is selected from the group consisting of hydrogen, methyl, ethyl, propyl, and butyl radicals.

It is preferred to use the compositions of the present invention substantially free of solvent, e.g. no more than 10% by weight of the composition is solvent. While it is not necessary that the composition contain any solvent at all, it has been found that minor amounts of solvent improve adhesion of the silicone composition to polyurethane foam, enhance leveling, and facilitate spraying. The solvent can be added to the composition of the present invention, or the solvent can be residual solvent from the manufacture of Component (A) as described above.

Examples of some of the more preferred solvents are naptha, mineral spirits, petroleum distillate, hexane, heptane, toluene, xylene, and the like. Naptha, mineral spirits and petroleum distillate are well known, commerical mixtures of hydrocarbons. Naptha is the preferred solvent for the compositions of the present invention.

The compositions of the present invention are made by mixing the components together with appropriate equipment.

Appropriate equipment for mixing is well known and widely available. Examples of suitable equipment are finger mixers, three roll mills, extruders with mixing sections, such as twin screw extruders or single screw extruders fitted with inline static mixers, Myers ® mixers, Baker Perkins ® type mixers, and other well known equipment.

For convenience in storage and handling, it is preferred to divide the compositions of the present invention into multiple parts, such as three parts. These parts are then provided to the applicator or consumer in separate containers. Mixing of the parts together can then be accomplished in a spray gun mixing chamber.

For example, if a three part system is used, the first part can comprise Component (A), the acrylofunctional or epoxyfunctional silane if desired, and the acyloxysilane if desired. The second part can comprise Component (B), added solvent if desired, and the filler, Component (C). The third part can comprise the organotin catalyst and inhibitor if desired. The three parts are mixed prior to application. An alternative example is as follows: First, the catalyst and inhibitor are added to Component (B). The mixture of Component (B) and catalyst is then metered to a mixer, where it is mixed with a mixture of Components (A) and (D), then pumped immediately to a spray gun. Mixing can also be accomplished using converging spray patterns from different nozzles. Those skilled in the art will recognize other possible configurations and methods of mixing the components.

The compositions of the present invention are applied to polyurethane foam and allowed to cure, thus forming a laminate.

The compositions can be applied to the foam by any reasonable means, such as by brush, roller, trowel and the like, but application by spray gun is preferred.

Application of the composition of the present invention as two coats with a spray gun is highly preferred. It has been found that application as two coats helps provide more uniform coverage. It is preferred that compositions of the present invention contain different amounts and/or different identities of filler in order to provide shade or color contrast. It is most preferred that the filler for the first coat be comprised of a major portion of carbon black, so as to provide a shade which contrasts with polyurethane foam, the natural color of which is beige. It is most preferred that the filler for the second coat be comprised of a major portion of titania, thereby providing a contrast to the first coat and an attractive appearance.

The combined thickness of the two coats should be at least 0.005 cm (0.002 inches) and less than 0.25 cm (0.1 inch). More preferably, the combined thickness of the two coats is from 0.025 cm (0.010 inches) to 0.15 cm (0.060 inches).

The compositions of the present invention have excellent adhesion to polyurethane foam when applied to that substrate. When two or more coats of the compositions of the present invention are applied, said coats have excellent adhesion to one another. The compositions of the present invention provide excellent protection from ultraviolet radiation and water penetration to polyurethane foam. The laminates produced furnish excellent roofing and tank-covering systems.

The following Examples are presented to further illustrate the present invention. Parts and percentages in the Examples are by weight unless otherwise specified. The term Me in the Examples represents the methyl radical.

TEST PROCEDURES

The following test procedures were used in evaluating the compositions of the present invention.

Working Time, Snap Technique

Samples were evaluated for working time by, first, freshly mixing a curable composition, then inserting a microspatula into the composition periodically, and withdrawing the microspatula a distance of 2.5 cm (1 inch) from the surface of the composition. When the maximum working time had elapsed, the sample strung out, broke, and rebounded, or snapped. Time values determined by this test are believed to be ±2% reproducible.

Tensile Strength and Elongation

Tensile strength and elongation values reported herein were measured by the general procedure set forth in American Society for Testing and Materials, (ASTM), Standard D412.

Durometer, Shore A

Durometer, a measure of the identation hardness of a material, was measured by the general procedure of ASTM Standard D2240.

Hail Simulation Test

Hail resistance of cured compositions of the present invention when applied to and cured over polyurethane foam was evaluated herein by dropping 5 cm (2 inch) diameter steel balls onto the coating from a distance of 1.8 meter (6 feet) and 6.4 meters (21 feet). If the coating remained intact in this test it was said to have passed the hail simulation test.

SYNTHESIS OF COMPONENT (A)

A mixture was charged to a vessel provided with a stirrer. The mixture consisted of:

(i) 41.2 parts of an organosilicon resin composed of $Me_3SiO_{\frac{1}{2}}$ units and $SiO_{4/2}$ units in the ratio of 0.6 $Me_3SiO_{\frac{1}{2}}$ units to 1 $SiO_{4/2}$ unit;

(ii) 41.2 parts of a polymer having the average formula $$Me_3SiO(MeHSiO)_{35}SiMe_3;$$

and 17.6 parts of xylene.

This mixture, with continuous stirring, was heated to a temperature of 150° C. The pressure in the vessel was gradually reduced to a value between 40 mm and 50 mm Hg. Heating under reduced pressure was continued for approximately 2 hours. During this time, volatilized xylene was removed and condensed in a reservoir separate from the vessel containing the mixture. After 2 hours, the reaction product was recovered. It was a substantially solvent free liquid organosilicon resin as described hereinabove as Component (A) of the compositions of the present invention.

EXAMPLE 1

Two mixtures were made with the following composition:

Mixture I 69 parts of Component (A) synthesized as above described 17 parts of a polydiorganosiloxane having the general formula $$HO(Me_2SiO)_{830}H \text{ (Component B)}$$

14 parts of naphtha

Mixture II 61 parts of Component (B) as described above in this Example
17 parts of titania
21 parts of naphtha Twenty parts of Mixture I, 40 parts of mixture II and 2.0 parts of dibutyltindiacetate were mixed together, thus forming a composition of the present invention consisting of:

| | |
|---|---|
| Component (A) | 49.6 parts |
| Component (B) | 100 parts |
| Component (C) | 24.5 parts |
| Component (D) | 0.7 parts |
| naphtha | 42.4 parts |

This composition was spread onto a releasing surface and allowed to cure at room temperature. The tensile strength of the resulting cured composition was determined to be 450 pounds per square inch, the elongation was found to be 190%, and the Shore A durometer was found to be 40.

Mixtures I and II respectively were held in separate, sealed containers at room temperature for four months. Compositions of the present invention were made periodically by following the procedure of this Example. After 4 months, the tensile, elongation, and durometer were not found to have significantly changed.

EXAMPLE 2-11

The procedure of Example 1 was followed for varying proportions of the components. Compositions and cured physical properties are found in Table 1.

TABLE 1

| | Parts of Component | | | | | Physical Properties | | |
|---|---|---|---|---|---|---|---|---|
| Example | (A) | (B) | (C) | (D) | Naphtha | Durometer | Tensile | Elongation |
| 2 | 26.4 | 100 | 26 | 2.87 | 133 | 28 | 610 (psi) | 402 (%) |
| 3 | 26.4 | 100 | 26 | 3.83 | 133 | 26 | 541 | 325 |
| 4 | 26.4 | 100 | 26 | 4.79 | 133 | 30 | 485 | 273 |
| 5 | 26.4 | 100 | 26 | 5.75 | 133 | 35 | 561 | 259 |
| 6 | 26.4 | 100 | 26 | 6.70 | 133 | 34 | 615 | 298 |
| 7 | 49.6 | 100 | 24.5 | 5.39 | 152 | 17 | 327 | 352 |
| 8 | 49.6 | 100 | 24.5 | 7.19 | 152 | 42 | 707 | 310 |
| 9 | 49.6 | 100 | 24.5 | 8.99 | 152 | 43 | 783 | 289 |
| 10 | 49.6 | 100 | 24.5 | 10.8 | 152 | 55 | 854 | 280 |

TABLE 1-continued

| | Parts of Component | | | | | Physical Properties | | |
|---|---|---|---|---|---|---|---|---|
| Example | (A) | (B) | (C) | (D) | Naphtha | Durometer | Tensile | Elongation |
| 11 | 49.6 | 100 | 24.5 | 12.6 | 152 | 52 | 784 | 240 |

EXAMPLE 12-16

Two mixtures were made with the following compositions:

Mixture III

| Component (A) of Example 1 | 77.25 parts |
|---|---|
| carbon black | 5.09 parts |
| gamma-glycidoxypropyltrimethoxysilane | 11.77 parts |
| vinyltriacetoxysilane | 5.89 parts |

Mixture IV

| Component (B) of Example 1 | 89.88 parts |
|---|---|
| titania | 1.12 parts |
| naphtha | 8.98 parts |

Mixture III and IV were mixed with one another and with dibutyltindiacetate to provide the compositions listed in Table 2. Each of these Examples were coated and cured on polyurethane foam. The adhesion of each sample to the foam was checked by attempting to peel the cured composition from the foam. A result of 100% cohesive failure is ideal. Such a result indicates that the value for adhesion of the cured composition to the foam is greater than the strength of the cured composition per se. See Table 2.

TABLE 2

Adhesion to Polyurethane Foam

| Example | (A) parts | (B) parts | $TiO_2$ | Carbon Black | Naphtha | (D) | Vinyl triacetoxy-silane | Gamma glycidoxy-propyltri-methoxy-silane | Type of Failure |
|---|---|---|---|---|---|---|---|---|---|
| 12 | 21.57 | 100 | 1.23 | 1.40 | 9.9 | 2.78 | 1.62 | 3.3 | adhesive |
| 13 | 30 | 100 | 1.23 | 2.1 | 9.9 | 2.78 | 2.44 | 4.89 | cohesive |
| 14 | 43 | 100 | 1.23 | 2.83 | 9.9 | 2.78 | 3.28 | 6.51 | cohesive |
| 15 | 53.7 | 100 | 1.23 | 3.56 | 9.9 | 2.78 | 4.12 | 8.18 | cohesive |
| 16 | 64.4 | 100 | 1.23 | 4.23 | 9.9 | 2.78 | 4.89 | 9.85 | cohesive |

EXAMPLES 17-20

Following the general procedure of Example 1, four compositions containing 0, 6, 12, and 18 parts of methacryloxypropyltrimethoxysilane respectively were made and cured. These four samples were evaluated for sheen and surface slickness. The value for sheen and surface slickness were subjectively assigned, by an experienced observer, on a scale of 1 to 10. A value of 10 represented maximum sheen or maximum surface slickness. A value of 1 represented a total lack of these qualities. See Table 3.

TABLE 3

Sheen and Surface Slickness

| Example | Component | | | | alkyl triace-toxy-silane[1] | Acrylo-func-tional silane[1] | Sheen | Surface Slickness |
|---|---|---|---|---|---|---|---|---|
| | (A) | (B) | (C) | (D) | | | | |
| 17 | 24 | 100 | 440 | 4 | 3 | 6 | 8 | 6 |
| 18 | 24 | 100 | 440 | 4 | 3 | 12 | 8 | 8 |
| 19 | 24 | 100 | 440 | 4 | 3 | 18 | 8 | 10 |
| 20 | 24 | 100 | 440 | 4 | 3 | 0 | 5 | 4 |

[1] A mixture of methyltriacetoxysilane and ethyltriacetoxysilane.

EXAMPLES 21 and 22

Formulations having the following compositions passed the hail simulation test when cured upon polyurethane foam:

| | Composition | | | |
|---|---|---|---|---|
| Example | Parts (A) | Parts (B) | Parts (C) | Parts (D) |
| 21 | 44.4 | 100 | 25.4 | 5.0 |
| 22 | 48.4 | 100 | 9.2 | 4.8 |

COMPARISON EXPERIMENT

In a comparison experiment, a composition similar to Example 1 was made, excluding the filler, and using a combination of methyltrimethoxysilane and a titanate condensation catalyst. The resulting composition was coated on a releasing substrate in thin section and allowed to cure at room temperature. The cured material was found to be gummy on the bottom. Additionally, the composition gassed excessively upon cure.

That which is claimed is:

1. A composition comprising the product obtained by mixing:
   (A) from 1.0 to 400 parts by weight of the reaction product of
      (i) an organosilicon resin consisting essentially of $R_3SiO_{\frac{1}{2}}$ units and $SiO_{4/2}$ units, wherein R represents a monovalent hydrocarbon radical, and the ratio of $R_3SiO_{\frac{1}{2}}$ units to $SiO_{4/2}$ units is from 0.6/1 to 0.9/1, and
      (ii) a polyorganohydrogensiloxane;
   (B) 100 parts by weight of a polydiorganosiloxane having the general formula $HO(R'_2SiO)_xH$, wherein R' represents a monovalent hydrocarbon radical and x has a value of from 10 to 1000;
(C) from 1 to 150 parts by weight of a filler; and
(D) from 0.10 to 13.3 parts by weight of an organotin catalyst.

2. A composition as claimed in claim 1 wherein Component (A) is reacted with a reagent selected from the group consisting of acyloxysilanes, oximosilanes, and acyl halides before said mixing.

3. A composition as claimed in claim 1 wherein there is added to said composition from 1 to 40 parts by weight of a compound selected from the group consisting of ketones, aldehydes, carboxylic acids and alkylacetoxysilanes.

4. A composition as claimed in claim 1 wherein there is added to said composition from 0.1 to 20 parts by weight of a silane selected from the group consisting of epoxyfunctional silanes and acrylofunctional silanes.

5. A composition as claimed in claim 1 wherein there is present from 1 to 200 parts of solvent.

6. A composition as claimed in claim 2 wherein there is added to said composition:
1 to 40 parts by weight of a compound selected from the group consisting of ketones, aldehydes, carboxylic acids and alkylacetoxysilanes;
0.1 to 20 parts by weight of a silane selected from the group consisting of epoxyfunctional silanes and acrylofunctional silanes; and 1 to 200 parts of solvent.

7. A composition as claimed in claim 1 wherein Component (A) is present from 50 to 200 parts by weight; Component (C) is present from 2 to 20 parts by weight; and Component (D) is present from 1.0 to 6.0 parts by weight.

8. A composition as claimed in claim 7 wherein Component (A) is reacted with a reagent selected from the group consisting of acyloxysilanes, oximosilanes, and acyl halides before said mixing.

9. A composition as claimed in claim 7 wherein there is added to said composition from 1 to 40 parts by weight of a compound selected from the group consisting of ketones, aldehydes, carboxylic acids and alkylacetoxysilanes.

10. A composition as claimed in claim 7 wherein there is added to said composition from 0.1 to 20 parts by weight of a silane selected from the group consisting of epoxyfunctional silanes and acrylofunctional silanes.

11. A composition as claimed in claim 7 wherein there is present from 1 to 200 parts of solvent.

12. A composition as claimed in claim 8 wherein there is added to said composition:
1 to 40 parts by weight of a compound selected from the group consisting of ketones, aldehydes, carboxylic acids and alkylacetoxysilanes; 0.1 to 20 parts by weight of a silane selected from the group consisting of epoxyfunctional silanes and acrylofunctional silanes; and 1 to 200 parts of solvent.

13. A composition as claimed in claim 7 wherein Component (A) is present from 97.0 to 161.0 parts by weight; Component (C) is present from 5.6 to 10.3 parts by weight; and Component (D) is present from 1.9 to 3.2 parts by weight.

14. A composition as claimed in claim 13 wherein Component (A) is reacted with a reagent selected from the group consisting of acyloxysilanes, oximosilanes, and acyl halides before said mixing.

15. A composition as claimed in claim 13 wherein there is added to said composition from 1 to 40 parts by weight of a compound selected from the group consisting of ketones, aldehydes, carboxylic acids and alkylacetoxysilanes.

16. A composition as claimed in claim 13 wherein there is added to said composition from 0.1 to 20 parts by weight of a silane selected from the group consisting of epoxyfunctional silanes and acrylofunctional silanes.

17. A composition as claimed in claim 13 wherein there is present from 1 to 200 parts of solvent.

18. A composition as claimed in claim 14 wherein there is added to said composition:
1 to 40 parts by weight of a compound selected from the group consisting of ketones, aldehydes, carboxylic acids and alkylacetoxysilanes; 0.1 to 20 parts by weight of a silane selected from the group consisting of epoxyfunctional silanes and acrylofunctional silanes; and 1 to 200 parts of solvent.

19. A method of protecting polyurethane foam, said method comprising:
(1) applying to said polyurethane foam, a composition comprising the product obtained by mixing:
(A) from 1.0 to 400 parts by weight of the reaction product of
(i) an organosilicon resin consisting essentially of $R_3SiO_{\frac{1}{2}}$ units and $SiO_{4/2}$ units, wherein R represents a monovalent hydrocarbon radical, and the ratio of $R_3SiO_{\frac{1}{2}}$ units to $SiO_{4/2}$ units is from 0.6/1 to 0.9/1, and
(ii) a polyorganohydrogensiloxane;
(B) 100 parts by weight of a polydiorganosiloxane having the general formula $HO(R'_2SiO)_xH$, wherein R' represents a monovalent hydrocarbon radical and x has a value of from 10 to 1000;
(C) from 1 to 150 parts by weight of a filler; and
(D) from 0.10 to 13.3 parts by weight of an organotin catalyst; and
(2) allowing said product to cure, thus forming a laminate.

20. A method as claimed in claim 19 wherein the product is applied as two coats.

21. A method as claimed in claim 20 wherein Component (A) is reacted with a reagent selected from the group consisting of acyloxysilanes, oximosilanes, and acyl halides before said mixing.

22. A method as claimed in claim 20 wherein there is added to said composition from 1 to 40 parts by weight of a compound selected from the group consisting of ketones, aldehydes, carboxylic acids and alkylacetoxysilanes.

23. A method as claimed in claim 20 wherein there is added to said composition from 0.1 to 20 parts by weight of a silane selected from the group consisting of epoxyfunctional silanes and acrylofunctional silanes.

24. A method as claimed in claim 20 wherein there is present from 1 to 200 parts of solvent.

25. A method as claimed in claim 21 wherein there is added to said composition:
1 to 40 parts by weight of a compound selected from the group consisting of ketones, aldehydes, carboxylic acids and alkylacetoxysilanes; 0.1 to 20 parts by weight of a silane selected from the group consisting of epoxyfunctional silanes and acrylofunctional silanes; and 1 to 200 parts of solvent.

26. A method as claimed in claim 20, wherein Component (A) is present from 50 to 200 parts by weight; Component (C) is present from 2 to 20 parts by weight; and Component (D) is present from 1.0 to 6.0 parts by weight.

27. A method as claimed in claim 26 wherein Component (A) is reacted with a reagent selected from the group consisting of acyloxysilanes, oximosilanes, and acyl halides before said mixing.

28. A method as claimed in claim 26 wherein there is added to said composition from 1 to 40 parts by weight of compound selected from the group consisting of ketones, aldehydes, carboxylic acids, and alkylacetoxysilanes.

29. A method as claimed in claim 26 wherein there is added to said composition from 0.1 to 20 parts by weight of a silane selected from the group consisting of epoxyfunctional silanes and acrylofunctional silanes.

30. A method as claimed in claim 26 wherein there is present from 1 to 200 parts of solvent.

31. A method as claimed in claim 27 wherein there is added to said composition:
   1 to 40 parts by weight of a compound selected from the group consisting of ketones, aldehydes, carboxylic acids and alkylacetoxysilanes; 0.1 to 20 parts by weight of a silane selected from the group consisting of epoxyfunctional silanes and acrylofunctional silanes; and 1 to 200 parts of solvent.

32. A method as claimed in claim 26, wherein Component (A) is present from 97.0 to 161.0 parts by weight; Component (C) is present from 5.6 to 10.3 parts by weight; and Component (D) is present from 1.9 to 3.2 parts by weight.

33. A method as claimed in claim 32 wherein Component (A) is reacted with a reagent selected from the group consisting of acyloxysilanes, oximosilanes, and acyl halides before said mixing.

34. A method as claimed in claim 32 wherein there is added to said composition from 1 to 40 parts by weight of a compound selected from the group consisting of ketones, alkehydes, carboxylic acids and alkylacetoxysilanes.

35. A method as claimed in claim 32 wherein there is added to said composition from 0.1 to 20 parts by weight of a silane selected from the group consisting of epoxyfunctional silanes and acrylofunctional silanes.

36. A method as claimed in claim 32 wherein there is present from 1 to 200 parts of solvent.

37. A method as claimed in claim 33 wherein there is added to said composition:
   1 to 40 parts by weight of a compound selected from the group consisting of ketones, aldehydes, carboxylic acids and alkylacetoxysilanes; 0.1 to 20 parts by weight of a silane selected from the group consisting of epoxyfunctional silanes and acrylofunctional silanes; and 1 to 200 parts of solvent.

38. The laminate produced by the method of claim 19.

39. The laminate produced by the method of claim 20.

40. The laminate produced by the method of claim 21.

41. The laminate produced by the method of claim 22.

42. The laminate produced by the method of claim 23.

43. The laminate produced by the method of claim 24.

44. The laminate produced by the method of claim 25.

45. The laminate produced by the method of claim 26.

46. The laminate produced by the method of claim 27.

47. The laminate produced by the method of claim 28.

48. The laminate produced by the method of claim 29.

49. The laminate produced by the method of claim 30.

50. The laminate produced by the method of claim 31.

51. The laminate produced by the method of claim 32.

52. The laminate produced by the method of claim 33.

53. The laminate produced by the method of claim 34.

54. The laminate produced by the method of claim 35.

55. The laminate produced by the method of claim 36.

56. The laminate produced by the method of claim 37.

* * * * *